US006123980A

United States Patent [19]

Pearson et al.

[11] Patent Number: 6,123,980

[45] Date of Patent: Sep. 26, 2000

[54] PREPARING GRANULATED SUGAR BLENDS AND PRODUCTS

[75] Inventors: Thomas N. Pearson, Sugar Land; Mary J. Schaefer, Richmond, both of Tex.; Bryan C. Tungland, Oxbow, N. Dak.

[73] Assignee: Imperial Sugar Company, Sugar Land, Tex.

[21] Appl. No.: 08/980,697

[22] Filed: Dec. 1, 1997

[51] Int. Cl.[7] .................. A23P 1/02; C13F 3/00; C13F 5/00

[52] U.S. Cl. .................. 426/658; 426/659; 426/464; 426/473; 426/519; 127/63

[58] Field of Search .................. 426/658, 443, 426/455, 456, 464, 465, 473, 506, 519, 659; 127/42, 63

[56] References Cited

U.S. PATENT DOCUMENTS

| | | | |
|---|---|---|---|
| 2,809,895 | 10/1957 | Swisher et al. | 99/140 |
| 3,011,897 | 12/1961 | Grosvenor, Jr. et al. | 99/141 |
| 3,320,074 | 5/1967 | Gebbardt et al. | 99/141 |
| 3,506,457 | 4/1970 | Gidlow et al. | 99/141 |
| 3,615,723 | 10/1971 | Meade | 99/206 |
| 3,674,557 | 7/1972 | Gray, Jr. | 127/62 |
| 3,795,746 | 3/1974 | Walton | 426/96 |
| 3,922,339 | 11/1975 | Shear | 424/22 |
| 3,929,503 | 12/1975 | Yamauchi | 127/58 |
| 3,930,048 | 12/1975 | Wookey et al. | 426/548 |
| 3,932,615 | 1/1976 | Ito et al. | 424/80 |
| 4,423,085 | 12/1983 | Chen et al. | 426/632 |
| 4,855,326 | 8/1989 | Fuisz | 514/777 |
| 4,873,085 | 10/1989 | Fuisz | 424/400 |
| 4,925,380 | 5/1990 | Meisner | 425/131.1 |
| 5,075,291 | 12/1991 | DuRoss | 514/60 |
| 5,112,407 | 5/1992 | Sakai et al. | 127/58 |
| 5,338,365 | 8/1994 | Stapp et al. | 127/2 |
| 5,354,856 | 10/1994 | Kawashima | 536/127 |
| 5,472,733 | 12/1995 | Degady et al. | 426/660 |
| 5,549,757 | 8/1996 | Morano | 127/42 |

FOREIGN PATENT DOCUMENTS

| | | |
|---|---|---|
| 0607991 | 7/1994 | European Pat. Off. . |
| 2426437 | 12/1974 | Germany . |
| 0495355 | 12/1975 | U.S.S.R. . |
| 0516744 | 6/1976 | U.S.S.R. . |
| 1240691 | 7/1971 | United Kingdom . |
| WO94/21826 | 9/1994 | WIPO . |

*Primary Examiner*—Keith D. Hendricks
*Assistant Examiner*—Drew Becker
*Attorney, Agent, or Firm*—Locke Liddell & Sapp LLP

[57] ABSTRACT

A method of preparing a granulated sugar blend provides a homogenous flowable product. The pulverized sugar is mixed with a wetting agent and granulated at low pressure. The additives to form the blend may include flavors, fragrances, colorings, functional food additives and pharmaceutically and nutritionally active ingredients.

64 Claims, 2 Drawing Sheets

PREPARING GRANULATED SUGAR BLENDS AND PRODUCTS

BACKGROUND

Sugar in various forms has long been used in the preparation of foods and beverages, as well as in many other applications. Sugar is often used as a basic ingredient in recipes, and is commercially available in various forms including crystals, granulated and powdered sugars, and sugar blends such as brown sugar. While sugar is a generic term that is generally used to refer to sucrose, it may also be used to refer to other types of sugar such as glucose, fructose, maltose and lactose which also find wide-ranging uses in similar applications.

There is a continuing need for new and improved sugar products and blends with physical characteristics that better suit particular applications of such products. For example, with sugar products and blends that are used in food and beverage applications, it is generally desirable for the sugar or sugar blend to readily dissolve when mixed with other ingredients. Also, sugar can be used as part of a delivery system for pharmaceuticals, nutritional additives and other ingestible ingredients.

In addition to the ease of dissolution, many other characteristics of sugar products and blends, such as color and flavor, may also bear on the effectiveness of such products for their intended purposes. Other characteristics such as the flowability of a product may have significant impact on packaging and other considerations which may in turn affect the suitability of a product for particular purposes, as well as the economics associated with marketing the product.

SUMMARY

A method of preparing a granulated sugar blend has been developed that provides a homogenous flowable product, providing improved handling characteristics. A pulverized sugar substrate is combined with an additive and a wetting agent. In one embodiment of the invention, the additive is in non-liquid form such as a powder, and is a separate component with respect to the wetting agent. In another embodiment of the invention, the wetting agent may also function as the additive, as in the case where a syrup is used as a wetting agent that also provides a flavor.

Where a separate wetting agent and additive are used, a pulverized sugar substrate and a non-liquid additive are combined with the wetting agent to form a homogenous mixture. In one embodiment of the invention, the sugar substrate and additive may be combined by pre-mixing before the wetting agent is added. In another embodiment, a non-pulverized sugar substrate may be mixed with a non-liquid additive, and the mixture may then be pulverized prior to combination with the wetting agent.

The homogenous mixture is granulated at a pressure of less than about 100 psi and a temperature of preferably less than about 70° C. In one embodiment, the wetting agent may be heated prior to mixing. The temperature to which the wetting agent is heated may have a direct relationship to the solids content of the wetting agent. This is particularly the case when the wetting agent is a syrup. After granulation, the granules may be then conditioned in various ways. Conditioning may include: reducing the size of the granules at least along one dimension; segregating the granules based on size; and drying the granules by various methods including tumbling the granules in a dry, cool air stream. The drying process produces granules with a final moisture content in the range of about 0.1% to about 5%.

In one embodiment of the invention, the wetting agent may be a syrup which also functions as a flavor additive. When combined with the pulverized sugar substrate, it produces a flowable brown sugar. The sugar substrate may be in the form of granules or in the form of a powder. The syrup should have a Brix in the range of about 65° to about 85° and more specifically have a Brix in the range of about 81° to about 83°. The mixture is mixed without the addition of heat. In the case of a syrup that contains a solids content, the syrup may be heated from about 46° C. to about 52° C.

In another embodiment, a flowable granulated sugar blend is prepared by combining a pulverized sugar substrate and a wetting agent including an additive that is mixed with the wetting agent prior to combining with the pulverized sugar substrate. The sugar substrate and wetting agent/additive mixture are mixed to form a homogenous mixture with a moisture content of about 0.1% to about 6.0%. The mixture is granulated at a pressure of less than about 100 psi and at a temperature of preferably less than about 70° C.

In another embodiment of the invention, a flowable brown sugar may be produced by heating a molasses-type syrup to a temperature of 49°±3° C., having a Brix of 82°±0.50°, an invert content of 20°±5% on a dry basis, a purity of 65.5±2.5, and a color of 43,000±5,000 RBU. The syrup is mixed with a pulverized sugar substrate to form a homogenous mixture, the mixture is about 20% syrup and about 80% sugar substrate by weight. The mixture is without heat addition. The mixture is granulated at a pressure of less than 100 psi. The granules are dried to a final moisture content of 4±1%. The granules are reduced in size along at least one dimension to form a flowable brown sugar.

The invention is not limited to methods for producing flowable brown sugar products. By varying the qualities of the sugar substrate, the additive, and the wetting agent, methods for producing other flowable sugar products are available.

The products produced by the process described above are also contemplated as part of the invention.

DETAILED DESCRIPTION

Figure 1:
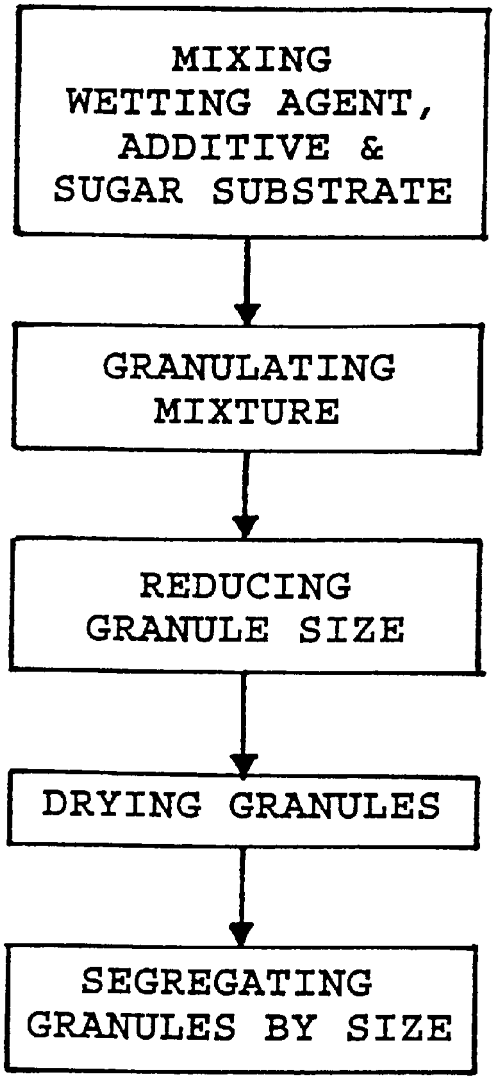
FIG. 1 is a schematic flow chart of the method steps in preparing a granulated sugar blend using a separate wetting agent and additive.

FIG. 1 illustrates one example of the invention, wherein a granulated sugar blend is prepared using a separate wetting agent and additive. A sugar substrate is combined with an additive and a wetting agent. The sugar substrate may be pulverized prior to mixing with the additive, or pulverized after mixing with a non-liquid additive. It is preferred that the pulverized sugar substrate resemble a commercial 10X powdered sugar of about 40 $\mu$m particle size and containing no starch. More specifically, it is preferred that the sugar substrate has an approximate mean particle size of 40 $\mu$m with 1% of the particles being no larger than 150 $\mu$m and 6% of the particles being no larger than 75 $\mu$m. The sugar substrate is prepared by a grinder mill with air classification capability, such as that available from the Mikro-Pul or Prater Corporations.

Also, the sugar substrate and additive may be combined by pre-mixing before the wetting agent is added, or the additive may be pre-mixed with the wetting agent prior to mixing with the sugar substrate, or the sugar substrate, additive, and wetting agent may be mixed simultaneously.

Additives may include spices, spice flavorings, cocoa, cocoa substitutes, cinnamon, fruit extracts, artificial flavorings and preservatives. Functional food additive may also be used, including inulin, polyols, acidulants, hydrocolloids, emulsifiers, and sweeteners including acesulfame-K, aspartame and stevioside. Additives with pharmaceutical or nutritional activity may be used, including vitamins, soluble dietary fibers, standard cold remedies, sports nutrition and performance ingredients, weight loss agents, and antibiotics.

The wetting agent may be water, fruit juice concentrates, polyols, carbohydrate slurries, syrups and mixtures thereof. The wetting agent may include the additive.

Mixing should be controlled to achieve a homogenous mixture of the sugar substrate, additive, and wetting agent. While batch mixing generally yields greater control over the mixing process than continuous mixing, continuous mixing may also be used. A ribbon blender system available from LCI Corporation is the preferred mixer. LCI's paddle mixer design may also be used, as well as the EXTRUD-O-MIX system available from the Hosokawa Bepex Corporation. Further, it is also contemplated that other mixer designs can be used that are integrated with other components of the granulation process.

In the next step of the process shown in FIG. 1, the mixture is extruded in a granulation apparatus at a pressure of less than 100 psi. The granulating process which occurs in the granulator, including extruding the mixture and forming the extrudate into granules, is collectively referred to as granulation. Limiting the granulation pressure to under 100 psi ensures that undesired alterations of the characteristics of the mixture, such as color and flavor, will not result from the granulation step. For the same reason, the granulation temperature, including resulting temperature increases due to compression during granulation, should be conducted at a temperature of preferably less than about 70° C. The preferred granulation apparatus is the dome granulator available from LCI Corporation.

There are certain operating parameters of the dome granulator that affect finished product performance. In order of priority, these are: the clearance between the screw and the head of the granulator (preferred clearance is less than 1.0 mm); the screen thickness (preferred thickness is 1.5 mm); and the moisture content of the mixture (preferred moisture content is 0.1% to 6.0%). Lower screen thicknesses and lower moisture content both yield less compaction of the granules. Less compaction is advantageous where ease in dissolving the granules is desired.

While first run granulation will achieve satisfactory results in most cases, repeated granulation may offer better overall mixing and more homogenous distribution of syrup within the granules, also resulting in lower surface color. When implemented, a repeated granulation step is conducted under the same pressure and temperature constraints as the initial granulation.

Though the dome granulator from LCI Corporation is a preferred granulation apparatus, the process may also be implemented through other styles of granulation apparatus, such as LCI Corporation's basket granulator, and XTRUDER design granulator.

After granulation, the granules are reduced in size along at least one dimension to form the granulated sugar blend. This step is carried out in a conditioning phase of the process. The preferred apparatus for conditioning the size of the granules is a granulation conditioner and dryer available from Wenger. It is contemplated that other types of equipment may also be used to condition the granules, such as that available from Wyssmont Co., and the size of the granules may be conditioned in the same step of the process where the granules are dried, or in a separate step. Product particle size and degree of compaction appear to play significant roles with regard to the rate of dissolution and dispersability, as well as packaging characteristics.

Granules may be subjected to a spheritization process in order to achieve better packing characteristics. This may be accomplished with the MARUMERIZER apparatus available from LCI Corporation. However, it is preferable not to spheritize the granules as the process tends to result in denser granules that are more difficult to dissolve.

The granules are dried to a preferable moisture content range of 0.1% to 5.0%. The granules generally only require surface particle conditioning and very little drying. Tumbling the conditioned granules in a dry, cool air stream generally provides adequate effects. Other low temperature drying methods known in the art may also be used to achieve a desired moisture content.

As a final step to the process, the granules may be segregated according to size. This task is preferably accomplished by the granule conditioning equipment previously described.

Figure 2:
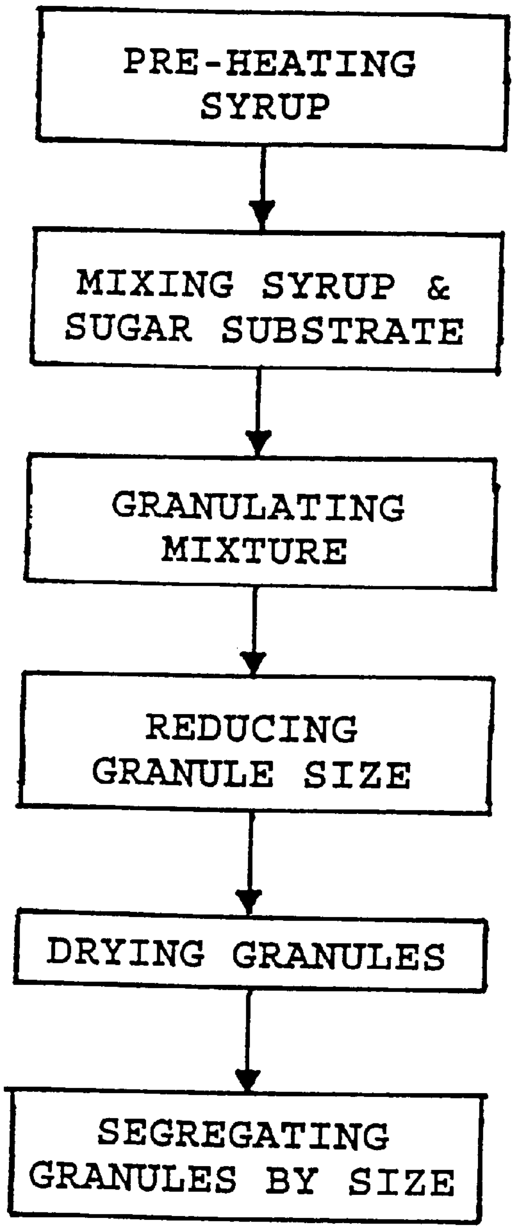
FIG. 2 is a schematic flow chart of the method steps in preparing a granulated sugar blend using syrup as wetting agent and flavor additive.

With reference to FIG. 2, a granulated sugar blend is prepared using syrup as both a wetting agent and flavor additive. A syrup is preferred that is high in flavor components, such as a molasses-type syrup or an enrobing syrup. It is also preferable that the syrup have the following characteristics: a Brix of 82°±0.50°; an invert content of 20°±5% on a dry basis; a purity of 65.5±2.5; and a color of 43,000±5,000 RBU. The syrup is heated and then mixed with a sugar substrate that may be in the form of either granules or a pre-pulverized powder.

The amount of mixing necessary is generally related to the Brix of the syrup. Mixing should be controlled to achieve homogenous mixing and stopped after the mixture becomes substantially homogenous. Extended mixing may result in a pastry-like consistency which may impede granulation. While batch mixing generally yields greater control over the mixing process than continuous mixing, continuous mixing may also be used.

The remaining steps shown in FIG. 2 may be carried out under the conditions described above for the same steps shown in FIG. 1.

The following examples are presented for purposes of illustration and not for limitation.

EXAMPLE 1

A flowable granulated brown sugar blend is prepared using syrup as both a wetting agent and flavor additive. A molasses-type syrup is heated to a temperature of 49°±3° C. The syrup is then mixed with a pulverized sugar substrate to form a homogenous mixture of about 20% syrup and about 80% sugar substrate by weight. After the syrup and sugar substrate are mixed, no heat is added to the mixture. The mixture is then granulated at a pressure of less than 100 psi. The granulation temperature, including resulting temperature increases due to compression during granulation, is conducted at a temperature of preferably less than about 70° C. After granulation, the granules are reduced in size along at least one dimension to form the granulated sugar blend. The granules are then tumbled dry in a dry, cool air stream to a moisture content of 4±1%. Finally, the granules are segregated by size.

EXAMPLE 2

A flowable granulated chocolate sugar blend is prepared in accordance with the steps described in EXAMPLE 1, except that ingredients are added or substituted as follows:

Sucrose, powdered 67.4 wt %

Molasses syrup 16.6 wt %

Cocoa 15.0 wt %

Vanilla 1.0 wt %

EXAMPLE 3

A flowable granulated maltodextrin sugar blend is prepared in accordance with the steps described in EXAMPLE 1, except that ingredients are added or substituted as follows:

Sucrose, powdered 92.0 wt %

Maltodextrin 5.0 wt %

Water 3.0 wt %

EXAMPLE 4

A flowable granulated inulin sugar blend is prepared in accordance with the steps described in EXAMPLE 1, except that ingredients are added or substituted as follows:

Sucrose, powdered 87.0 wt %

Inulin 10.0 wt %

Water 3.0 wt %

EXAMPLE 5

A flowable granulated honey sugar blend is prepared in accordance with the steps described in EXAMPLE 1, except that ingredients are added or substituted as follows:

Sucrose, powdered 85.0 wt %

Dark amber honey 15.0 wt %

EXAMPLE 6

A flowable granulated invert sugar blend is prepared in accordance with the steps described in EXAMPLE 1, except that ingredients are added or substituted as follows:

Sucrose, powdered 95.0 wt %

Invert syrup 5.0 wt %

EXAMPLE 7

A flowable granulated cinnamon sugar blend is prepared in accordance with the steps described in EXAMPLE 1, except that ingredients are added and substituted as follows:

Sucrose, powdered 80.0 wt %

Molasses syrup 15.0 wt %

Cinnamon 5.0 wt %

EXAMPLE 8

A flowable granulated gum sugar blend is prepared in accordance with the steps described in EXAMPLE 1, except that ingredients are added and substituted as follows:

Sucrose, powdered 90.0 wt %

Carrageenan Gum 5.0 wt %

Water 5.0 wt %

EXAMPLE 9

A flowable granulated Emulsifier sugar blend is prepared in accordance with the steps described in EXAMPLE 1, except that ingredients are added and substituted as follows:

Sucrose, powdered 91.0 wt %

Votated plastic mono and diglyceride emulsifier 15.0 wt %

Water 4.0 wt %

EXAMPLE 10

A flowable granulated coconut sugar blend is prepared in accordance with the steps described in EXAMPLE 1, except that ingredients are added and substituted as follows:

Sucrose, powdered 82.8 wt %

Inulin 12.0 wt %

Water 5.0 wt %

Coconut extract 0.2 wt %

EXAMPLE 11

A flowable granulated enzyme sugar blend is prepared in accordance with the steps described in EXAMPLE 1, except that ingredients are added and substituted as follows:

Sucrose, powdered 90.0 wt %

Invertase Immobilized Enzyme 5.0 wt %

Water 5.0 wt %

EXAMPLE 12

A flowable granulated aspirin sugar blend is prepared in accordance with the steps described in EXAMPLE 1, except that ingredients are added and substituted as follows:

Sucrose, powdered 90.0 wt %

Aspirin, powdered 5.0 wt %

Water 5.0 wt %

Other embodiments are within the scope of the following claims.

What is claimed is:

1. A method of preparing a granulated sugar blend, comprising:

combining a pulverized sugar substrate, an additive in a non-liquid form, and a wetting agent;

mixing the sugar substrate, the non-liquid additive, and the wetting agent to form a homogeneous mixture thereof, the mixture having a moisture content of about 0.1% to about 6.0%; and granulating the mixture in a dome granulator at a pressure of less than about 100 psi.

2. The method of claim 1, wherein combining comprises pre-mixing the sugar substrate and the non-liquid additive.

3. The method of claim 1, wherein the combining comprises pulverizing the sugar substrate and non-liquid additive and mixing the sugar substrate and non-liquid additive prior to combination with the wetting agent.

4. The method of claim 1, further comprising:

re-granulating the granules at a pressure of less than about 100 psi.

5. The method of claim 1, further comprising:

re-granulating the granules at a temperature of about less than 70° C.

6. The method of claim 1, further comprising heating the wetting agent prior to mixing.

7. The method of claim 6, wherein a direct relationship exists between the temperature to which the wetting agent is heated and the solids content of the wetting agent.

8. The method of claim 1, further comprising conditioning the granules.

9. The method of claim 8, wherein conditioning comprises reducing the size of the granules along at least one dimension.

10. The method of claim 9, further comprising segregating the granules based on size.

11. The method of claim 8, wherein conditioning comprises drying the granules.

12. A method of claim 8, wherein conditioning comprises cooling the granules.

13. A method of claim 8 wherein conditioning comprises tumbling the granules.

14. The method of claim 11, wherein the granules is dried to a final moisture content of about 0.1% to about 5.0%.

15. The method of claim 1, wherein the non-liquid additive comprises a dry powder.

16. The method of claim 1, wherein the additive is selected from the group consisting essentially of flavors, fragrances, colorings, functional food additives, pharmaceutically and nutritionally active ingredients, and mixtures thereof.

17. The method of claim 1, wherein the wetting agent comprises the group consisting essentially of water, fruit juice concentrates, polyols, carbohydrate slurries, syrup and mixtures thereof.

18. The method of claim 17, wherein the wetting agent comprises the wetting agent and a flavor.

19. The method of claim 18 wherein the wetting agent and the flavor comprises syrup.

20. The method of claim 19, wherein the syrup has a Brix in the range of about 65° to about 85°.

21. The method of claim 19, wherein the syrup comprises a brown sugar syrup having a Brix in the range of about 81° to about 83°.

22. The method of claim 19, further comprising heating the syrup to a temperature of about 46° C. to about 52° C.

23. The method of claim 1, wherein the granulated sugar substrate comprises powdered sugar.

24. The method of claim 1, wherein the mixture is mixed without the addition of heat.

25. A product prepared according to the method of claim 1.

26. The product of claim 25, wherein the additive is selected from the group consisting essentially of cocoa, cocoa substitutes and mixtures thereof.

27. The product of claim 25, wherein the mixture comprises about 67% granulated sugar, about 17% syrup, about 15% cocoa non-liquid flavor, and about 1% vanilla extract by weight.

28. The product of claim 25, wherein the additive comprises inulin.

29. The product of claim 25, wherein the non-liquid flavor comprises spices, spice flavors and mixtures thereof.

30. The product of claim 25, wherein the mixture comprises about 2.5% to about 5% cinnamon by weight.

31. A method of preparing a granulated sugar blend, comprising:

combining a pulverized sugar substrate and a wetting agent including an additive;

mixing the sugar substrate and the wetting agent to form a homogeneous mixture thereof, the mixture having a moisture content of about 0.1% to about 6.0%; and granulating the mixture in a dome granulator at a pressure of less than about 100 psi.

32. The method of claim 31, wherein the additive is selected from the group consisting essentially of flavors, fragrances, colorings, functional food additives, pharmaceutically and nutritionally active ingredients, and mixtures thereof.

33. The method of claim 31, wherein the wetting agent including an additive is prepared by pre-mixing a wetting agent without an additive with a wetting agent with an additive.

34. The method of claim 31, further comprising:

granulating the granules at a temperature of less than about 70° C.

35. The method of claim 31, further comprising heating the wetting agent prior to mixing.

36. The method of claim 31, further comprising conditioning the granules.

37. The method of claim 36, wherein conditioning comprises reducing the size of the granules along at least one dimension to form the granulated sugar blend.

38. The method of claim 37, further comprising segregating the sugar granules based on size.

39. The method of claim 36, wherein conditioning comprises drying the granules.

40. The method of claim 39, wherein the granules is dried to a final moisture content of about 0.1% to about 5.0%.

41. A method of claim 36 wherein the conditioning comprises cooling the granules.

42. A method of claim 36 wherein the conditioning comprises tumbling the granules.

43. The method of claim 31, wherein the wetting agent comprises the group consisting essentially of water, fruit juice concentrates, polyols, carbohydrate slurries, syrups and mixtures thereof.

44. A method of claim 31 wherein the wetting agent including an additive comprises a wetting agent which is a liquid selected from the group consisting essentially of flavors, fragrances, colorings, functional food additives and pharmaceutically and nutritionally active ingredients and mixtures thereof.

45. A product prepared according to the method of claim 31.

46. The product of claim 45, wherein the mixture comprises about 80% sugar substrate and about 20% syrup by weight.

47. The product of claim 46, wherein the syrup comprises a Brix of about 81° to about 83°.

48. The product of claim 46, wherein the syrup is heated to 49±3° C. and the syrup comprises a dark soft syrup having a Brix of 82±0.50°, an invert content of 20±5% on a dry basis, a purity of 65.5±2.5 and a color of 43,000±5,000 RBU.

49. The product of claim 31, wherein the wetting agent comprises honey.

50. The product of claim 45, wherein the mixture comprises greater than about 85% sugar substrate and less than about 15% honey by weight.

51. The product of claim 49, wherein the mixture comprises about 12.5% honey by weight.

52. The product of claim 46, wherein the syrup comprises about 5.0% to about 7.5% invert syrup by weight.

53. The method of claim 43, wherein the wetting agent is a syrup and has a Brix in the range of about 67° to about 85°.

54. The method of claim 53, wherein the wetting agent is a syrup and has a Brix in the range of about 65° to about 69°.

55. The method of claim 53, further comprising heating the syrup to a temperature of about 46° C. to about 52° C.

56. The method of claim 31, wherein the pulverized sugar substrate comprises powdered sugar.

57. The method of claim 31, wherein the mixture is mixed without the addition of heat.

58. The method of claim 31, wherein the wetting agent including an additive is prepared by pre-mixing a non-liquid additive with a wetting agent without an additive.

59. A method of preparing a granulated sugar blend, comprising:

pre-mixing a pulverized sugar substrate and a non-liquid flavor;

mixing the sugar substrate and non-liquid flavor with a wetting agent to form a homogeneous mixture thereof, the mixture having a moisture content of about 0.1% to about 6.0%, the mixture being mixed without the addition of heat;

granulating the mixture in a dome granulator at a pressure of less than about 100 psi to form granules;

drying the granules to a final moisture content of 4±1%; and reducing the size of the granules along at least one dimension to form the granulated sugar blend.

60. A product prepared according to the method of claim 44.

61. The product prepared according to the method of claim 60 wherein the wetting agent is a syrup.

62. A product prepared according to the method of claim 59.

63. A method of preparing a flowable brown sugar, comprising:

heating a brown sugar syrup to a temperature of 49±3° C., the syrup having a Brix of 82±0.50°, an invert content of 20±5% on a dry basis, a purity of 65.5±2.5, and a color of 43,000±5,000 RBU;

mixing the brown sugar syrup with a pulverized sugar substrate to form a homogenous mixture thereof, the mixture comprising about 20% syrup and about 80% sugar substrate by weight, the mixture being mixed without the addition of heat;

granulating the mixture in a dome granulator at a pressure of less than about 100 psi to form flowable granules;

drying the granules to a final moisture content of 4±1%; and reducing the size of the granules along at least one dimension to form the flowable sugar blend.

64. A product prepared according to the method of claim 63.

* * * * *